United States Patent [19]

Aoyama et al.

[11] 4,332,574
[45] Jun. 1, 1982

[54] MOTORCYCLE SPROCKET

[75] Inventors: Takahiko Aoyama; Akira Nakaya, both of Akashi, Japan

[73] Assignee: Kawasaki Jukogyo Kabushiki Kaisha, Hyogo, Japan

[21] Appl. No.: 113,889

[22] Filed: Jan. 21, 1980

[30] Foreign Application Priority Data

Jan. 29, 1979 [JP] Japan ................................. 54-10204

[51] Int. Cl.³ ............................................. F16H 55/30
[52] U.S. Cl. .................................................... 474/161
[58] Field of Search ................. 474/161, 156; 74/443; 198/834, 843; 180/219, 231, 72; 280/261

[56] References Cited

U.S. PATENT DOCUMENTS

| 2,953,930 | 9/1960 | Meyer | 474/161 X |
| 3,448,629 | 6/1969 | Pfrank et al. | 474/156 X |
| 3,659,908 | 5/1972 | Comellas | 474/156 X |
| 3,730,013 | 5/1973 | Slemmons | 474/161 X |
| 3,854,345 | 12/1974 | Reinsma | 474/161 |
| 3,889,550 | 6/1975 | Boggs et al. | 474/161 |
| 3,958,837 | 5/1976 | Chagawa | 74/443 X |

FOREIGN PATENT DOCUMENTS

| 1039807 | 9/1958 | Fed. Rep. of Germany | 474/161 |
| 719694 | 12/1954 | United Kingdom | 474/161 |
| 901249 | 7/1962 | United Kingdom | 474/161 |

Primary Examiner—Allan D. Herrmann
Attorney, Agent, or Firm—Sughrue, Mion, Zinn, Macpeak & Seas

[57] ABSTRACT

A sprocket for a motorcycle in which noise due to chain-sprocket intermeshing is reduced. A pair of resilient vibration reducing members are provided, one on each side of a metal sprocket body. The circumferential edges of the vibration reducing members are either curved or tapered to maintain contact with the motorcycle drive chain over a wide range of load conditions.

8 Claims, 4 Drawing Figures

MOTORCYCLE SPROCKET

BACKGROUND OF THE INVENTION

The present invention relates to a sprocket intended for use with a motorcycle in noise and vibration which caused when the metal chain and the sprocket body intermesh with one another is absorbed by elastic members of, for instance, rubber.

When a motorcycle is operating, the power transmitting chain generally is strongly vibrated. The chain may merely vibrate mechanically or it may both vibrate and cause noise. There are two kinds of noise which are caused when the chain intermeshes with the sprocket body. The first is a sound caused by contact of the sprocket body and the chain rollers while the second is a sound caused by contact of the sides of the sprocket body and the chain plates.

In order to eliminate the intermeshing noise, a sprocket as shown in FIG. 4 has been proposed in the art. Vibration preventing members b are fixedly secured to both sides of the sprocket body a. For this arrangement, the diameter of the vibration preventing member b is substantially equal to the effective diameter of the sprocket body a and the lower portion of a chain c is in contact with the circumferential surfaces of the vibration preventing members b. As used herein, "effective diameter" is the diameter of the sprocket body measured to the bottom of the teeth along its periphery.

In a motorcycle, the load applied tends to change greatly. As a result, when the load changes from high to low or vice versa, the intermeshing load due to the pulling of the chain greatly changes as a result of which the intermeshing depth is changed. Therefore, in the sprocket shown in FIG. 4, the contact pressure of the chain c on the vibration preventing members b also changes. Accordingly, for a low load, the vibration preventing members b cannot effectively absorb the contact sound which is caused by contact of the sides of the sprocket body a and the chain plates of the chain c. That is, the conventional sprocket cannot provide a uniform noise reducing effect.

Accordingly, an object of the invention is the provision of a sprocket for a motorcycle in which all of the above-described drawbacks accompanying a conventional sprocket have been eliminated.

SUMMARY OF THE INVENTION

To accomplish this and other objects of the invention, there is provided a motorcycle chain sprocket in which vibration preventing members constructed of, for instance, rubber are fixedly secured to both sides of the sprocket body, the circumferential surface of each vibration preventing member being a curved or tapered surface, so that at the time of either high or low load the edges of the chain are brought into contact with the curved or tapered surfaces whereby the vibrations of the sprocket body and the chain are positively absorbed thereby and a uniform noise reducing effect is provided at all times.

BRIEF DESCRIPTION OF THE DRAWINGS

FIGS. 1 and 2 show an embodiment of the invention in which FIG. 1 is a side view showing a power transmitting sprocket on the rear wheel side and FIG. 2 is a sectional view taken along the diameter of the sprocket.

DESCRIPTION OF THE PREFERRED EMBODIMENTS

Figure 1:
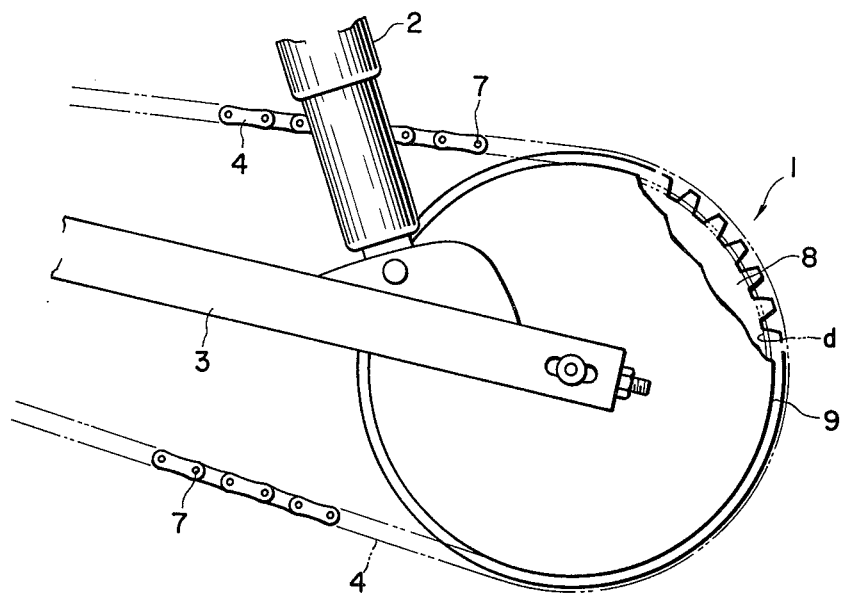
Figure 2:
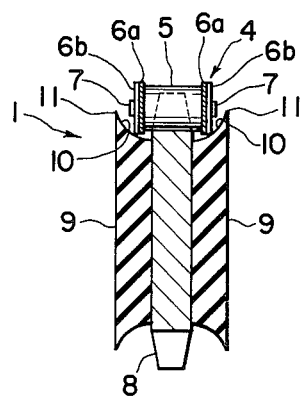

Preferred embodiments of the invention will be described with reference to the accompanying drawings. In FIGS. 1 and 2, designated generally by reference numeral 1, is a power transmitting sprocket on the rear wheel side of the motorcycle which is rotatably supported on the rear end portion of a swing arm 3 to which a shock absorber is connected. A metal power transmitting endless chain 4 is positioned around the sprocket 1 and a sprocket (not shown) fixedly mounted on the output shaft of the engine. The chain 4 is an ordinary one. Chain plates 6a and 6b are provided on both sides of the chain rollers 5 of the chain 4. The chain plates 6a and 6b are coupled to one another by means of pins 7 which extend through the chain rollers 5.

The sprocket 11 has a metal sprocket body 8 to both sides of which vibration preventing members 9 are bonded by that treatment. The vibration preventing member 9 is made of elastic material such as rubber and has a bonding area whose diameter is substantially equal to the effective diameter d of the sprocket body 8. The vibration preventing member 9 is so shaped that its diameter increase gradually towards the outside with the circumferential surface forming a curved surface 10 so that the flexibility increases towards the periphery 11 on the outside of the vibration preventing member 9. The distance between the two opposed outside surfaces of the two vibration preventing members 9 is slightly larger than the width of the chain 4.

With the chain 4 positioned on the sprocket 1 thus constructed, even when the intermeshing load is varied, that is, even when the intermeshing depth of the chain 4 varies, the chain plates 6a and 6b remain in contact with the curved surface 10 at all times as a result of which the vibrations of the sprocket body 8 and the chain 4 are absorbed directly by the vibration preventing members 9.

In the above-described embodiment of the invention, the vibration preventing members 9 are bonded to the sprocket body 8 by heat treatment. However, the members 9 may be adhered to the sprocket body by other means or the members 9 may be secured to the sprocket body according to a technique in which metal reinforcing parts are embedded in the mounting base of the member 9 and the metal reinforcing parts are connected to the sprocket body 8 by means of bolts or by welding.

It goes without saying that such vibration preventing members may also be provided on the sprocket which is mounted on the output shaft of the engine.

Figure 3:
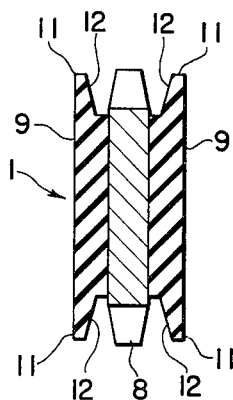
FIG. 3 is a sectional view similar to FIG. 2 showing a second embodiment of the invention.
Figure 4:
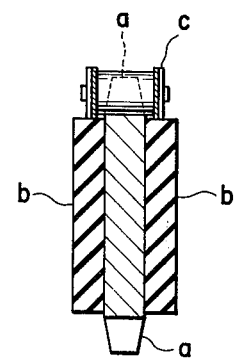
FIG. 4 is a sectional view similar to FIGS. 2 and 3 showing a conventional power transmitting sprocket.

Another example of the vibration preventing members 9 according to the invention is shown in FIG. 3. The circumferential surface is formed as a tapered surface 12 in this embodiment. The effect of the vibration preventing members 9 is substantially the same as that of the above-described vibration preventing members in which the circumferential surface is formed as a curved surface. The member 9 shown in FIG. 3 can be more easily manufactured than that shown in FIG. 2.

As is apparent from the above description, the sprocket for a motorcycle according to the invention has the vibration preventing members fixedly secured to the sprocket body and the vibration preventing member is made of elastic material such as rubber and is so shaped that the diameter increases gradually toward the outside thereof and the circumferential surface is formed as a curved or tapered surface so as to be brought into contact with the chain. Therefore, the sprocket thus constructed can positively absorb the vibrations of the sprocket body and the chain. Furthermore, even when the load applied to the motorcycle changes, that is, when the intermeshing load varies, or even when the chain vibrates sidewardly, noise which otherwise would be caused is eliminated because the flexibility of the vibration preventing member on each side of the sprocket body is greater toward the periphery of the outside of the member. The intermeshing noise of motorcycles equipped with sprockets according to the invention was measured with the result that the noise caused in acceleration was found to be remarkably reduced.

What is claimed is:

1. A sprocket for a motorcycle comprising: a metal sprocket body; and a pair of vibration preventing members made of an elastic material, each vibration preventing member having a bonding surface whose diameter is substantially equal to the effective diameter of said metal sprocket body, said pair of vibration preventing members being secured one on each side of said sprocket body through said bonding surfaces, each vibration preventing member being so shaped that the diameter thereof increases gradually toward the outside thereof in such a manner that when a load is applied to a chain running around said sprocket outside portions of said chain running over said sprocket are in contact with circumferential surfaces of said vibration preventing members for a plurality of load values so as to reduce wavelike vibrations in said chain and reduce noise.

2. The sprocket of claim 1 wherein said circumferential surfaces are formed as curved surfaces.

3. The sprocket of claim 1 wherein said circumferential surfaces are formed as tapered surfaces.

4. The sprocket of claim 1 wherein said pair of vibration preventing members are thermally bonded to said sprocket body.

5. The sprocket of claim 1 further comprising reinforcing members embedded in said pair of vibration preventing members for attaching said pair of vibration preventing members to said body.

6. The sprocket of claim 5 wherein said reinforcing members are bolted to said sprocket body.

7. The sprocket of claim 5 wherein said reinforcing members are welded to said sprocket body.

8. The sprocket of any of claims 1–7 wherein said vibration preventing members are constructed of rubber.

* * * * *